United States Patent [19]
Li et al.

[11] Patent Number: 5,681,604
[45] Date of Patent: Oct. 28, 1997

[54] STAIN-INHIBITING AGENT FOR DYES WITH AFFINITY FOR PROTONATABLE NITROGEN, COMPOSITIONS CONTAINING SAME AND USES THEREOF

[76] Inventors: Hualin Li; Mongia Gagan; C. Paul Malone; Robert W. Keown, all of University of Delaware, College of Human Resources, Department of Textiles, Design, and Consumer Economics, Newark, Del. 19716

[21] Appl. No.: 84,524

[22] Filed: Jun. 29, 1993

[51] Int. Cl.⁶ .................. A23L 1/27; A23L 1/275
[52] U.S. Cl. .............. 426/540; 426/250; 426/262; 426/268
[58] Field of Search .................. 426/540, 250, 426/262, 268

[56] References Cited

U.S. PATENT DOCUMENTS

| | | |
|---|---|---|
| 3,790,344 | 2/1974 | Frickenhaus et al. . |
| 4,442,104 | 4/1984 | Wedral et al. .......... 426/250 |
| 4,780,099 | 10/1988 | Greschler et al. . |
| 4,833,009 | 5/1989 | Marshall . |
| 4,963,409 | 10/1990 | Liss et al. . |
| 5,032,136 | 7/1991 | Fitzgerald et al. . |
| 5,096,726 | 3/1992 | Keown et al. . |
| 5,096,747 | 3/1992 | Scholla et al. . |
| 5,571,551 | 11/1996 | Fusi et al. .............. 426/540 |

FOREIGN PATENT DOCUMENTS

| | | |
|---|---|---|
| 1276410 | 11/1990 | Canada . |
| 5635968 | 4/1981 | Japan . |

OTHER PUBLICATIONS

Journal of the Chemical Society, 1961 Part II pp. 1421-2600, London pp. 1829-1842.
Oehrl, L. L., et al Chapter 4 in ACS Symposium No. 473, Food and Packaging Interactions II, S.J. Risch et al, pp. 37-52.
Weigmann, AATCC 1992, International Conf. and Exhib. Session 12, vol. 24, No. 9, p. 34 (1992).
Cook, C.C. et al, Textile Res. J. 47, 244 (1977).
Kamath, Y.K. et al. Proc. AATCC Conf. 230-233 (1977).
Harris, P.W. et al, Textile Chemist and Colorist 21, 25-30 (1989).

*Primary Examiner*—Esther Kepplinger
*Assistant Examiner*—Curtis E. Sherrer
*Attorney, Agent, or Firm*—Connolly & Hutz

[57] ABSTRACT

The staining effect (particularly with respect to the staining of polyamides) of a colorant such as a dye used in foods and beverages is inhibited by a compound of the formula

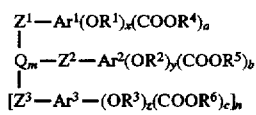

wherein:
- $Z^1$, $Z^2$, and $Z^3$ are the same or different and are each a bridging radical or a direct bond,
- $Ar^1$, $Ar^2$, and $Ar^3$ are the same or different and are aromatic or bicyclic radicals;
- Q is a fused, partially aromatic bicyclic radical,
- or Q is a carbohydrate residue having a non-repeating structure, in which case m is 1, or Q is a carbohydrate having repeating saccharide units, in which case Q along with its substituents is repeated m times, where m is the number of said repeating saccharide units, but
- when Q is not a carbohydrate residue, m is 1;
- $R^1$, $R^2$, and $R^3$ are H or polyhydroxybenzoyl,
- $R^4$, $R^5$ and $R^6$ are H or the residue of an esterified alcohol,
- x, y, and z are from 2 to 3,
- a, b, and c are from 0 to 1,
- n is from 0 to 1, except that when Q is an oligo- or polysaccharide having terminal saccharide units, n, in the terminal saccharide units, is from 0 to 2, and
- when n is zero, $-Z^1-Q_m-Z^2-$ is optionally a direct bond. Examples of these stain-inhibiting compounds include tannic acid, green tea extract, epicatechin gallate, and the reaction product of gallic acid and a carbohydrate.

20 Claims, No Drawings

STAIN-INHIBITING AGENT FOR DYES WITH AFFINITY FOR PROTONATABLE NITROGEN, COMPOSITIONS CONTAINING SAME AND USES THEREOF

BACKGROUND OF THE INVENTION

1. Field of the Invention

This invention relates to the art of inhibiting the staining action certain dyes by means of a stain-inhibiting agent. An aspect of this invention relates to artificially colored compositions (particularly ingestible compositions) in which the artificial colorant is an ingestible dye having an affinity for protonatable N-atoms, which artificially colored compositions further contain the stain-inhibiting agent. Still another aspect of this invention relates to a method for formulating food products or for forming a barrier against the staining of protonatable nitrogen-containing polymers such as polyamides (e.g. nylon, silk, wool, etc.) and other polymeric materials, particularly household materials, which contain protonatable nitrogen atoms.

2. Description of the Prior Art

Materials colored with insufficiently-fixed dyes that "run" or "bleed" or create stains are a familiar problem.

In the case of a single instance of staining of a garment or carpet or other fibrous material, the problem may appear to be small in economic terms, but the cumulative impact on marketing, particularly in the food industry, can be enormous. The consumer acceptance of several types of foods (particularly soft drinks or other types of drinks, baked goods, candies, cake mixes, gelatins, puddings, and other highly processed foods) can be adversely affected by dye migration or staining. For example, if a highly processed food product containing a dye approved for human consumption (in the U.S., these are generally the F, D & C dyes) packaged with a material containing a polyamide, and the dye migrates to and stains the polyamide, the internal appearance of the food package can be too aesthetically displeasing to be sold, even though the packaged product is perfectly safe to eat. This problem is sometimes referred to as "color bleed".

Consumer acceptance of artificially colored food products can also be adversely affected by stubborn stains produced by inadvertent spills on materials commonly found in homes, e.g. melamine-formaldehyde sheets on counter tops, polyamide fibers (particularly in wool or nylon carpets, clothes, including silk clothes, drapes, and other woven and nonwoven materials), etc. Soft drinks are especially likely to stain clothes, counter tops, drapes, and carpets, even though these drinks may contain only parts per million of the non-toxic dye.

Various stain-blocking agents have been investigated in terms of their ability to block or inhibit the staining action of the ingestible, non-toxic dyestuffs used in highly processed foods. Some of these agents are referred to as "resist agents" and can be anionic due to the presence of carboxylate (—COO⁻) and/or sulfonate (—SO₃⁻) groups. Typically, these agents are polymers of acrylic acid or, more typically, sulfonated aromatic compounds. See, for example, U.S. Pat. Nos. 4,780,099 (Greschler et al), issued Oct. 25, 1988, and 5,096,726 (Keown et al), issued Mar. 17, 1992. Treatment of synthetic polyamides with sulfonated aromatic compounds after dyeing of the polyamide is described in U.S. Pat. No. 3,790,344 (Frickenhaus et al), issued Feb. 5, 1974.

One study done by Cook et al in 1977, reported in *Textile Res. Journ.* 47, 244–249 (1977) suggests that compounds having a plurality of phenol or naphthol rings can serve as stain blockers.

One commercially available sulfonated aromatic compound ("MESITOL NBS", available from Mobay Chemical Co.) known to have stain-resistant properties is chemically defined as a sulfonic acid-substituted phenol-formaldehyde condensate and is a complex mixture of monomeric and polymeric materials which can be separated into a number of fractions varying widely in molecular weight. One group of fractions amounting to 67 weight-% of the mixture appears to be made up of insoluble, relatively high molecular weight polymeric material. Monomers and substituted monomers account for about 20 weight-%. There also appear to be one or more relatively low molecular weight polymeric fractions (the molecular weight appears to be roughly in the range of about 600 to 700) which apparently account for only about 10% of the total weight of this complex mixture.

Although the sulfonic acid-substituted phenol-formaldehyde condensate "resist agents" can be low in toxicity, they are typically synthetic compounds not having any close analogs in nature. Obtaining government approval for their use in foods involves the same quantum of proof of safety as would be required for any artificial food additive.

Accordingly, although some of these synthetic sulfonated aromatic compounds are used in stain-resisting agents applied directly to fibrous materials such as carpets, they are not presently used in foods.

Moreover, a very recent study suggests that only the low molecular weight polymeric fraction of the complex sulfonated phenol-formaldehyde condensate mixtures (which fraction is typically only about 10% by weight of the total mixture) provides a high level of stain-resist activity. The monomeric material and the insoluble polymeric fractions appear to have only slight stain-resist activity. This study therefore suggests further that the efficacy of such stain-resist agents, in terms of activity per mole of agent, could be improved significantly.

The mechanism by which "resist agents" or "stainblockers" or stain-inhibiting agents prevent staining is not fully understood, partly because the staining action of non-toxic dyestuffs has been studied in depth only rarely. According to the study carried out by C. C. Cook et al, *Textile Research Journal*, 47:244 (1977), the stain-inhibiting agent creates an electric barrier effect with respect to the anionic substituents of typical dyestuffs. The effect of pH on the effectiveness of stain-inhibition treatments of nylon is disclosed in U.S. Pat. No. 4,780,099. P. W. Harris et al, in *Textile Chemist & Colorist*, 21:25–30 (1989) have proposed that sulfonated aromatic compounds create a ring dyeing effect which hinders diffusion of a stain-causing dye by increasing the tortuosity of the diffusant. Since the add-on level of the sulfonated aromatic compound is not sufficient to block all the free amine end groups throughout the cross section of a polyamide fiber, Harris et al attribute stain inhibition to a double layer repulsion of the dye anions by the residual anionic charges of the surface-deposited stainblocker. Other studies include those of Kamath et al, who have demonstrated the use of microspectrophotometry to measure absorbance (see their study of ozone fading of disperse dyes in nylon in *Textile Research Journal*, 53:391 [1983]) and have very recently measured the stain resistance and the stainblocker content of stainblocker-treated nylon carpet fibers with the aid of microspectrophotometry. Y. K. Kamath et al, "Mechanisms of Stainblocker Function in Nylon Carpet Yarns", reported in the proceedings of the 1992 AATCC International Conference & Exhibition, pages 230 to 233 (Oct. 6, 1992); see also the abstract of Session 12, Oct. 6, 1992, 1:30 p.m., proceedings, Volume 24, No. 9, page 34.

Kamath et al (in the AATCC proceedings reference cited above) have attempted to clarify the mechanism for stain-inhibition activity (toward incoming dyes) by attributing some of the activity—in addition to activity attributed to the "double layer repulsion" effect proposed by Harris et al—to a "diffusion barrier" which inhibits entry and absorption or diffusion into the nylon fiber of both nonionic and anionic molecules. The diffusion barrier is described as a cross-linked barrier membrane formed by the ionomeric polymer with the polyamide near the surface of the polyamide fiber. The findings reported in this reference also provide further confirmation for the efficacy of the lower molecular weight fractions of the stainblocker.

An electric or ionic barrier effect, even if not the exclusive mechanism, is probably of considerable importance. Another stain-inhibition mechanism study, reported in Chapter 4 ("Interactions of Food, Drug and Cosmetic Dyes with Nylon and Other Polyamides") by L. L. Oehrl et al, ACS Symposium No. 473, *Food and Packaging Interactions II*, S. J. Risch et al, Editors, American Chemical Society, 1991, pages 37 to 52, concludes that the staining action of water-soluble dyestuffs containing sulfonate groups ($-SO_3^-$) or other anionic solubilizing groups is largely an acid-base reaction which results in the formation of ionic bonding. Anionic solubilizing groups such as the $-SO_3^-$ of F, D & C dyes can, of course, exist in either the salt form (e.g. $-SO_3Na$) or the sulfonic acid ($-SO_3H$) form, but in acid media, one would expect the sulfonic acid form to predominate. The stainable substrate (material which becomes stained) can contain one or more nitrogen-containing sites capable of accepting a proton. For example, the stainable substrate can comprise a polymer having such protonable sites in side chains, repeating units, or end groups, as in the case of the primary amine terminus of a polyamide or polypeptide, a pendent amine group attached to an amino acid unit or a melamine ring, or some other non-terminal group with a primary, secondary, or tertiary nitrogen atom with a moderately or strongly nucleophilic unbonded electron pair (including the $-NH-$ of a polyimide) or one or more combinations of these protonatable nitrogen sites. Perhaps the most common of these protonatable nitrogen sites is the primary amino group ($-NH_2$). Because the colored (stain-causing) material which comes into contact with the stainable substrate typically has a Ph less than 7 and typically contains some sulfonic acid groups, transfer of a proton from an $-SO_3H$ group to an N-atom should be possible. Upon protonation of that N-atom, a cation is formed, and the cation can form an ionic bond with a sulfonate group of the water-soluble dyestuff. When the protonation is a direct transfer of the proton of a sulfonic acid group on the dyestuff molecule to a protonatable nitrogen of the stainable substrate, the staining action can be viewed as an acid-base reaction.

This theory of staining protonatable N-containing materials is supported by evidence showing that staining or dye uptake by the stainable substrate is maximized at a pH below about 4. However, dye uptake does not always keep getting worse as the pH decreases and may level off or even diminish slightly at a pH below about 1 or 2. Oehrl et al account for the decrease in dye uptake at very low pH values by suggesting that, at these low pH values, each dyestuff molecule becomes more efficient in protonating nitrogen atoms, hence fewer dyestuff molecules are taken up by the substrate. The maximum number of dyestuff molecules taken up by the stainable substrate appears to be reached somewhere within the pH range of about 2 to about 4, which happens to encompass the $pK_a$ values of acids commonly used in foods, e.g. citric acid ($pK_a=3.13$).

Oehrl et al explain how dye uptake by the stainable substrate can be reliably measured in experiments conducted in a manner analogous to dye bath treatments; the stainable substrate is immersed for some specified period of time (e.g. one hour) in a bath containing the dyestuff, and, after removal of the substrate, the amount of dye remaining in the bath can be measured; in extreme cases >60%—sometimes even >80%—of the dyestuff is taken up by the stainable substrate; far less than this amount of uptake will produce a visible stain.

Mildly alkaline agents are not very suitable as stain-inhibiting agents for a variety of reasons. For example, some colored materials simply cannot b a marketed unless their pH is less than 7; a typical pH range for such colored materials is about 2 to about 4, which is exactly in the most dangerous pH range from the standpoint of staining with typical F, D & C dyes.

Given the likelihood of at least a partial role for the ionic or acid-base theory of staining protonatable N-containing polymeric materials, it should follow that a layer of a colorless compound having a plurality of its own anionic groups could provide a barrier to staining by taking up the dye in preference to the N-containing polymeric material or perhaps by repelling the dye. Of course, surface phenomena must be taken into account, because the person skilled in the art is typically dealing with dye migration or accidental spills, not the complete immersion of a stainable substrate in a dyebath for a prolonged period of time. The greater the surface-wettability of the stainable substrate, the greater the stain.

Whether or not these theories are valid, there is still a need for stain-inhibiting agents suitable for addition to foods which have very close analogs among natural materials or are themselves extracts or components of natural materials, so that, in use, a high level of safety in edible products (particularly human-edible products) will be more likely.

SUMMARY OF THE INVENTION

It has now been discovered that a class of polyhydroxy (including dihydroxy) aromatic ring-containing compounds (which can, if desired, be free of sulfonic acid or sulfonate groups) is surprisingly effective in inhibiting the stain-producing action of dyes and colored materials, at least in those situations in which the stainable substrate (material exposed to staining) contains a polymeric material having protonatable nitrogen sites. This class of polyhydroxyaromatic compounds can be found in extracts obtained from certain naturally occurring materials, and, for purposes of the present invention, these naturally-occurring materials are a preferred source of the compounds.

The above-mentioned class of polyhydroxaromatic compounds useful in this invention can be represented by formula I:

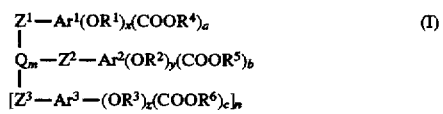

wherein:

$Z^1$, $Z^2$, and $Z^3$ are the same or different and are each a bridging radical (e.g. $-O-CO-$) or a direct bond, $Ar^1$, $Ar^2$, and $Ar^3$ are the same or different and are each a monocyclic aromatic radical or a bicyclic-radical comprising an aromatic ring fused to a six-member cyclooxaaliphatic ring (e.g. a bicyclic radical such as a benzodihydropyranyl group);

Q is a fused aromatic ring-containing bicyclic radical (e.g. a benzotropolone structure, a benzocylohexenone structure, a benzodihydropyranyl structure, or a similar benzocyclooxaaliphatic or benzocyclohexenone or benzocycloheptenone structure, all of which can be substituted or unsubstituted), or Q is a carbohydrate residue which has either a non-repeating structure (e.g. the residue of a monosaccharide) or a repeating structure (e.g. the residue of an oligo- or polysaccharide having m units); and when Q is a carbohydrate residue and said carbohydrate residue is an oligo- or polysaccharide residue, Q along with its substituents is repeated m times, where m is from 2 up to the number of repeating saccharide units in the oligo- or polysaccharide, but when Q is not a carbohydrate residue, m is 1;

$R^1$, $R^2$, and $R^3$ are the same or different and are each hydrogen or a polyhydroxybenzoyl radical such as 3,5-dihydroxybenzoyl or 3,4,5-trihydroxybenzoyl (galloyl), $R^4$, $R^5$, and $R^6$ are the same or different and are each H or the residue of an esterified alcohol, x, y, and z are the same or different and are each a number from 2 to 3, a, b, and c are the same or different and are each a number from 0 to 1, n is a number from 0 to 1, except that when Q is an oligo- or polysaccharide having terminal saccharide units, n, in the terminal saccharide units, is from 0 to 2, and when n is zero, —$Z^1$—$Q_m$—$Z^2$— is optionally a direct bond; however, if —$Z^1$—$Q_m$—$Z^2$— is a direct bond, it is particularly preferred that the compound of formula (I) not be synthetic but be obtained from natural sources (e.g. by extraction, isolation, and purification). Presently, the only case in which synthetic compounds can perform as well as naturally occurring compounds are those in which Q is a carbohydrate residue.

In one aspect of this invention, a compound of formula I is included in a colored composition wherein the colorant is a dye reactive with the a protonatable nitrogen of a polymeric material containing a protonatable nitrogen site, e.g. an amine group pendent from, or at the terminus of, a polymeric series of repeating units. A preferred embodiment of such a colored composition is a food product, particularly a food product having a pH less than 7 (1 wt. % in water, 23° C.).

Compounds of formula I can be made by total synthesis or partial synthesis from known starting materials (e.g. by esterifying a known polyol or carbohydrate with a polyhydroxybenzoic acid such as gallic acid). It is ordinarily preferred however that compounds of formula I be obtained by extraction from plant matter such as leafy materials, fruits, trees (e.g. tree bark), shrubs, or flowering plants.

A further aspect of this invention relates to methods for formulating artificially colored food products in which a compound of formula I is included as a stain-inhibiting agent.

Another aspect of this invention relates to treatment of a stainable substrate with a compound of formula I before or simultaneously with the exposure of the stainable substrate to a dye reactive with the a protonatable nitrogen of a polymeric material containing a protonatable nitrogen site.

DETAILED DESCRIPTION

Because the aromatic ring-containing compounds useful in this invention can be free of —$SO_3$ radicals, it would appear that they inhibit staining through a different mechanism as compared to prior art sulfonated phenol-containing stainblocking agents. Moreover, although this invention is not bound by any theory, the single phenolic hydroxyl group found on each aromatic ring of a typical phenol-aldehyde condensate is believed to be insufficient by itself to provide any stain-inhibiting effects, but the plurality of phenolic hydroxyl groups on each aromatic monocyclic or partially aromatic fused bicyclic structure of the class of compounds useful in this invention is believed to be involved in stain inhibition, perhaps through a relatively weak type of association with protonatable nitrogen or with NH which bears some resemblance to hydrogen bonding. Again, this invention is not bound by any theory, but it is believed that this relatively weak association is strengthened when the polyhydroxyaromatic compound has a molecular weight above about 200, preferably above 300. Low molecular weight polyhydroxyaromatic (including dihydroxaromatic) compounds such as pyrogallol and resorcinol do not appear to exhibit stain-inhibiting activity, and it is theorized that— particularly in the presence of liquid water—any association between these low molecular weight compounds and protonatable nitrogen- or NH-containing groups on the stainable substrate is very short-lived or easily overcome. Thus, polyhydroxyaromatic compounds useful in this invention typically have molecular weights in excess of 200, more typically >300, and their molecular weights can extend well into the thousands for oligo- and polysaccharides naturally or synthetically esterified with polyhydroxybenzoic acid residues (e.g. gallic acid residues).

In the case of polyhydroxbenzoic acid esters of high molecular weight α- and β-glycosides such as cellulose or starch, where the number of repeating glycoside units can reach about 4000, molecular weights up to 500,000 or even a million are a theoretical possibility, but no advantage appears to be gained by using such enormous polymeric molecules as stain-inhibiting agents. Moreover, these large molecules may fail to reach the protonatable nitrogen sites on the stainable substrate before stains begin to form. Accordingly, oligosaccharides with about 2 to 10 repeating saccharide units or partially hydrolyzed glycosides having less than 1500 repeating glycoside units are preferred over unmodified cellulose or starch as polyols to be esterified with polyhydroxaromatic compounds.

Preferred Stain-Inhibiting Agents

Stain-inhibiting agents useful in this invention typically contain compounds of the formula

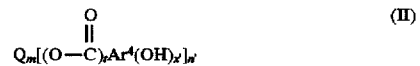

(II)

wherein:

x' is a number from 2 to 3;

t is 0 or 1, and when t=0, there is a direct bond from Q to $Ar^4$;

$Ar^4$ is a monocyclic aromatic radical or a bicyclic group in which one of the rings is a benzene ring and the other ring, to which the benzene ring is fused, is a partially unsaturated cycloaliphatic or cyclooxaaliphatic ring; thus, when $Ar^4$ is bicyclic it is typically a benzodihydropyranyl structure;

Q is the residue of a carbohydrate having m repeating saccharide units; m being at least 1, or m=1 and Q is a fused aromatic ring-containing bicyclic radical (e.g. a benzotropolone structure, a benzocylohexenone structure, a benzodihydropyranyl structure, or a similar benzocyclooxaaliphatic or benzocyclohexenone or benzocycloheptenone structure); and n' is a number from 2 to 3, unless Q is the residue of a carbohydrate having a plurality of repeating saccharide units; in which case, when Q is a terminal saccharide unit, n' is a number from 2 to 4.

The tropolone ring is peculiar to certain naturally occurring materials; it is a $C_7$ (cycloheptatrienolone) ring with sufficient aromaticity (resonance stabilization) to be characterized as "aromatic". Thus, when Q is a bicyclic structure comprising a benzene ring fused to a tropolone ring, Q in this case can be a benzotropolone (benzocycloheptenone) such as 3,4,6-trihydroxy-5H-benzocyclohepten-5-one.

In one preferred embodiment of formula II, $Ar^4$ is a substituted benzene ring, Q is the residue of a mono-, oligo-, or polysaccharide having m units, t=1, and n' is typically 2 or 3, more typically 2, in the intermediate saccharide units of a saccharide chain, and n' is typically 3 or 4 (usually 3) in the terminal units. The residues of an "oligosaccharide" can be residues of disaccharides such as sucrose, lactose, and the like. Typical polysaccharide residues include starch, partially hydrolyzed starch, naturally-occurring gums, and other carbohydrate residues having up to about 1500 repeating saccharide units. (Polysaccharides having up to 4000 units can of course be esterified with gallic acid, but as pointed out previously, there appears to be no advantage to such enormous molecules in the context of this invention.) The preferred monosaccharide or saccharide unit of the oligo- or polysaccharide is a hexose such as glucose or fructose.

Thus, when Q of formula II is the residue of a monosaccharide or an oligo- or polysaccharide having m units, the compounds of formula II are tannin-like substances such as tannic acid or a substance that bears a strong resemblance to tannic acid and other naturally-occurring compounds containing residues of ketohexose-like or aldohexose-like polyols in which the OH groups of the polyol (aldohexose or ketohexose) are esterified with a trihydoxybenzoic acid such as gallic acid (3,4,5-trihydroxybenzoic acid). Although the galloyl structure is not required in every compound or stain-inhibiting agent found useful in this invention, the galloyl structure is believed to be important because it contributes to the overall stain-inhibiting structure several adjacent or nearly adjacent phenolic hydroxyl groups and a substantial molecular mass increment. Not only do these overall stain-inhibiting structures have a molecular weight well in excess of 300, they also have, typically, nine phenolic hydroxyls per molecule or per repeating unit.

Tannins can be extracted from the bark of trees (e.g. oak trees) and from various fruits and leafy materials such as tea leaves or brewed tea. Some varieties of tea also contain materials which are detrimental to the objectives of this invention (e.g. compounds which produce stains), but such materials can be separated out with thin-layer chromotography. Brewed green tea is particularly preferred.

Tannic acid is a preferred stain-inhibiting agent of this invention, and the so-called hydrolyzable tannins are particularly preferred. Commercially-available tannic acid obtained from natural sources (usual empirical formula given as $C_{76}H_{52}O_{46}$) contains about 10% water and is water soluble. It may be a trisaccharide ester. It is a yellowish white to light brown, amorphous powder and is virtually non-toxic even in rather large doses ($LD_{50}$, oral, in mice=6.0 g/kg). Tannic acid behaves like a strong organic acid, showing an inflection point at a pH of about 4.5 when titrated with NaOH.

Another preferred type of stain-inhibiting agent contains a compound of the formula III

where t is 0 or 1, and when t=0, there is a direct bond from Q to $Ar^4$, x' is a number from 2 to 3, a' is 0 or 1, and where a'=1, R is H or the residue of an esterified alcohol, $Ar^4$ is as defined previously, Q is either a direct bond, in which case the radical

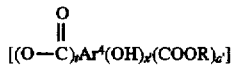

is dimerized, or Q is a bicyclic structure comprising a benzene ring fused to a partially unsaturated cycloaliphatic ring, e.g. a benzotropolone or benzocyclohexenone structure.

Compounds of this type include the granatins, epigallocatechin gallate, epicatechin gallate, theaflavin, and the like. Granatin A can also be called β-1,6 (s) hexhydroxydiphenoyl-D-glucose, hexahydroxydiphenic acid. Granatin B can also be called β-1,0 galloyl (R)-hexahydroxydiphenic acid, linked 3,6, dehydrohexahydroxydiphenic acid linked 2,4.

Particularly preferred natural sources of stain inhibitors of formula I (which formula is intended to encompass formulas II and III) include tea, strawberries, pomegranates, crabapples, stripe alder trees, forsythia, and oak trees.

Compounds of formula II in which Q is a carbohydrate such as a sugar can be obtained either by extraction from natural substances or by synthesis from the carbohydrate+gallic acid, in the presence of an acid catalyst typically used in Fischer esterification, e.g. a mineral acid such as sulfuric acid. The stain-inhibiting activity of these esterified carbohydrates is, however, lower than that of tannic acid obtained from natural sources such as tree bark.

The preferred carbohydrates are monosaccharides with a $C_6$-skeleton, e.g. glucose, mannose, fructose, galactose, and the like. For stain inhibition, optical isomerism appears to be relatively unimportant, hence D- and L-forms, racemic mixtures, etc. all appear to be useful in this invention. Tetroses and pentoses are less preferred, as are carbohydrate derivatives such as sorbitol and mannitol.

Esterification of a sugar with gallic acid is carried out by mixing these two starting materials together and adding 5 weight-% $H_2SO_4$ in excess, then boiling the reaction mixture until the equilibrium position is reached. The gallate ester is then extracted from the reaction medium with a simple ester such as ethyl acetate.

A similar procedure can be used to esterify 3,4-dihydro-2H-1-benzopyran-3,5,7-triol with gallic acid.

The following compounds, which can be extracted from naturally-occurring plant matter, are particularly preferred for use as stain-inhibition agents in compositions and methods of this invention.

| Compound Name or Type | Formula No. |
|---|---|
| Corilagin (typical tannic acid component) | I |
| Catechin, 2-(3,4-dihydroxyphenyl)-3,4-dihydro-2H-1-benzopyran-3,5,7-triol | IIa |

| Compound Name or Type | Formula No. |
|---|---|
| Epigallocatechingallate esters | IIb |
| Epigallocatechin gallate | IIc |
| Epicatechin gallate | IId |
| Theaflavin, 1,8-bis(3,4-dihydro-3,5,7-trihydroxy-2H-1-benzopyran-2-yl)-3,4,6-trihydroxy-5H-benzocyclohepten-5-one | III |
| Typical granitins | IV |

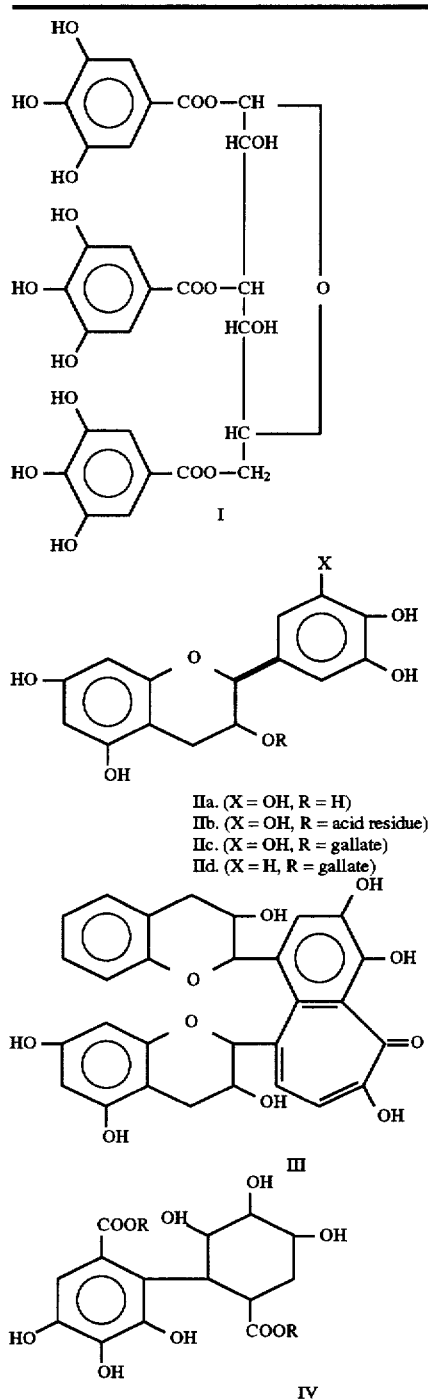

IIa. (X = OH, R = H)
IIb. (X = OH, R = acid residue)
IIc. (X = OH, R = gallate)
IId. (X = H, R = gallate)

R = alcohol or polyol (e.g. glucose) residues

Optimum stain inhibition appears to be obtained with trihydroxybenzoates of oligosaccharides (e.g. oligosaccharide gallates) having repeating hexose units and molecular weights in -the range of about 600 to about 2200. Concentrates containing very high levels of such compounds are preferably isolated from tea (e.g. brewed tea) by means of thin layer chromotography. Trihydroxybenzoyl triesters of hexose monosaccharides (empirical formula $C_{27}H_{24}O_{18}$) are less effective in this invention as compared to the natural tannic acid-like compounds separated from tea. These natural compounds are believed to be essentially gallic acid esters of di-, tri-, and/or tetrasaccharides; the chemistry of these naturally-occurring substances is complex and oftentimes cannot be represented accurately by a single compound. Moreover, polyhydroxybenzoic acids are, in effect, bifunctional from a polymerization standpoint (like hydroxycarboxylic acids) and can form polyesters having two or more repeating ester units.

Preferred Colored Products Containing Stain-Inhibiting Agents

As indicated previously, highly processed foods artificially colored with dyes approved for food, drug, and cosmetic use are examples of preferred products to which the stain-inhibiting agents can be added. The preferred colorants are dyes generally considered safe for ingestion by humans, including F, D & C dyes such as Brilliant Blue (F D & C Blue No. 1), Indigo Disulfoacid (F D & C Blue No. 2), Fast Green FDF (F D & C Green No. 3), Erythrosine (F D & C Red No. 3), Ponceau SX (F D & C Red No. 4) Allura Red (F D & C Red No. 40), Sunset Yellow (F D & C Yellow No. 6), Tartrazine (F D & C Yellow No. 5), Orange B, and similar soluble dyes containing anionic groups.

At first glance, many of these dyes appear to have very little in common from a molecular structure standpoint. There are at least two F, D & C dyes which are triarylmethanes (Blue 1 and Green 3), one indigoid (Blue 2), one xanthene (Red 3), three monoazos (Red 4, Red 40, Yellow 6), at least one pyrozolone (Yellow 5, which also has a monoazo group). Certain dyes which still carry an "F D & C" designation as a kind of shorthand identification have been "delisted" and are no longer considered safe for ingestion by humans, e.g. Orange I and Orange II. The delisted dyes are of course less preferred. The preferred dyes are generally artificially synthesized from starting materials obtained from non-edible sources such as petrochemicals, coal derivatives, and the like. These dyes, being synthetic rather than natural, are separate ingredients which do not occur in foods except as additives.

Despite fundamental differences in structure, all of these dyes have at least one anionic group substituted on a benzene or naphthalene ring structure, typically for the purpose of improving water solubility. The anionic group is generally the sulfonate radical (—$SO_3^-$), which can either be in salt form (e.g. —$SO_3Na$ or an internal salt form) or acid form (—$SO_3H$); most typically, the commercial form of the dye contains at least one sodium sulfonate group substituted on a benzene or naphthalene ring structure. The sulfonated benzene can be fused to a ring of the dye structure but is more typically an independent ring directly attached to an azo group or indirectly linked to a triarylmethane structure or whatever the dye moiety happens to be.

Although this invention is not bound by any theory, it is presently believed that the sulfonate or sulfonic acid auxochrome attached to the aromatic ring is the moiety common to all these dyes which probably plays a major role in the proposed acid-base or ionic-bonding mechanism of stain formation. Thus, all of these dyes could be represented by the general formulas DYE-Ar—SO$_3^-$ or, in the case of the fused aromatic ring, DYE(Ar—SO$_3^-$) where Ar is aromatic, typically a benzene ring, but Ar can also be a naphthalene group.

Although these dyes, being water soluble, can be easily washed off some substrates, they may adhere stubbornly to polyamides, polyimides, melamine-formaldehyde resins, polypeptides with free (e.g. terminal) primary or secondary amino groups, and similar polymeric materials, probably for the reasons outlined above (i.e. the acid-base or ionic-bonding stain formation mechanism). Therefore, according to one concept of this invention, the stain-inhibiting agent somehow interferes with interactions between sulfonate or sulfonic acid groups and protonated or protonatable nitrogen sites on these polymeric materials. In the case of ionic bonding, the stain inhibitor should protect an already-protonated nitrogen; in the case of the acid-base mechanism, the stain inhibitor would have to inhibit the transfer of a proton from —SO$_3$H to the unbonded electron pair on the nitrogen atom.

The amount of ingestible dye needed to provide deep shades of blue, yellow, green, red, purple, orange, etc. is relatively small compared to the weight of the complete food product, e.g. <1000 parts-per-million, by weight (ppm), of a fully constituted food product (including any diluents) or <5 wt.-% of a concentrated food product. Amounts less than 100 ppm, e.g. 1 to 50 ppm are conventionally used in fully constituted, highly processed food products (in the case of concentrates and powdered products prior to diluton, the ppm level is 1 to 3 orders of magnitude larger. Other artificial and synthetic additives include ingestible carboxylic acids (e.g. citric acid), sweetners, preservatives (butylated hyroxyaromatic compounds, sorbates, etc.), anti-caking agents (sulfates, phosphates, etc.), artificial flavors, synthetic vitamins and minerals, and the like. Other ingredients include malto-dextrin, sugars and other carbohydrates, natural flavors, and the like. The presence of these additives (or of sucrose or other sugars) appears to have no adverse effect upon the stain-inhibiting activity of the stain inhibitors used in this invention.

Particularly preferred colored food products of this invention are powdered materials which can become drinks when blended with water, e.g. powdered imitation fruit juices, punches, etc., including powdered orange juices such as TANG® and powdered sweet drinks such as KOOL-AID®. Some of these powders contain citric acid or some similar ingestible organic acid which can provide an aqueous solution with a pH of from 2 to 4 when present in the solution at a concentration ranging from 0.001 to about 0.1N, more typically 0.01N to about 0.1N. The amount of stain-inhibiting agent added to the colored food product is generally in the range of about 1 to about 2000 ppm, based on the weight of the fully constituted food product. Up to 8000 ppm of the stain inhibitor can be used, but no substantial improvement in stain inhibition is observed with >2000 ppm, and very substantial stain inhibition is achieved with as little as 8 to 50 ppm. From the standpoint of cost effectiveness, about 50 to about 500 ppm of stain inhibitor are preferred, and some of the stain inhibitors of this invention lack water solubility (and probably become aqueous dispersions) at levels beyond the 50–500 ppm range. When small amounts of anionic or nonionic detergent are added along with the stain inhibitor, practical effective levels of stain inhibitor can be lowered to as little as 10 ppm. The preferred anionic detergents contain sulfonate groups, as in the case of the sulfosuccinate diester detergents.

Particularly preferred food products besides powdered drinks include carbonated beverages, gelatins, puddings, and candies.

When a preferred food product is formulated according to this invention;

a. a food ingredient is colored with a color-imparting amount of a water-soluble dyestuff having sulfonate radicals (e.g., an F, D & C dye), and b. the potential staining action of the thus-colored food product is inhibited, with respect to a material having protonatable N-containing sites, e.g. a polyamide, by adding to the food product a stain-inhibiting agent comprising a plant matter extract containing a compound of formula I. As explained above, it is theorized that the stain-inhibiting agent forms a barrier against the staining of materials such as polyamides by becoming associated with a protonatable nitrogen atom in a linear polyamide chain or at an —NH$_2$ terminus of such a chain, the association with the protonatable nitrogen atom of the amine group involving a plurality of phenolic hydroxyl groups present in the stain-inhibiting agent.

Inhibition or Prevention of Staining

When nylon (e.g. nylon 6 or nylon 66) is first treated with a 1% by weight solution of a stain inhibitor of this invention and then dyed with F, D & C Red 40, the protective effect is comparable to a sulfonated phenol-aldehyde condensate such as MESITOL NBS (trademark). Further tests demonstrate the presence of a chemical bond of some sort between the stain inhibitors of this invention and linear aliphatic polyamides (e.g. of the nylon 6 or nylon 66 type). Indeed, the stain inhibitors useful in this invention are generally most effective in protecting this type of polyamide, and also the linear aromatic polyamides, but at least some protection of almost any protonatable nitrogen-containing polymer can be obtained, the polymers (besides linear aliphatic and aromatic polyamides) of greatest interest being protein-like or polypeptide materials (wool, etc.) and melamine-aldehyde condensates.

As used in this specification, the term "polyamide" is intended to include linear polyamides (derived from lactams or from the interaction of difunctional acid halides or difunctional carboxylic acids with difunctional amines or from amino acids), polymers of amino acids (including proteins), and crosslinked or crosslinkable polyamides derived from the interaction of carboxylic acids (or acid halides) and amines having a functionality >2. Because of the ready availability of caprolactam, pyrrolidone, adipic acid, hexamethylene diamine, sebacic acid, amine-substituted higher aliphatic carboxylic acids, phenylene diamine and its analogs, and terephthalic and isophthalic acid, the conventional nylons and aromatic polyamides (especially amine-terminated nylons) are of particular interest from the standpoint of stain inhibition or prevention.

Stain-inhibiting agents useful in this invention are less effective in re-solubilizing stains than they are in preventing the stain in the first place. Accordingly, to protect a polymeric material containing protonatable nitrogen sites, stain-inhibiting a amount of the stain-inhibiting agent is generally applied to the polymeric material before or simultaneously with the dye rather than after the dye.

The following Examples illustrate the principle and practice of this invention without limiting its scope.

EXAMPLE 1

Tannic Acid As Stain-Inhibiting Agent

To investigate the stain-inhibiting properties of tannic acid, three solutions were prepared from the commercial product cherry KOOL-AID®, a powdered mixture containing citric acid, maltodextrin (from corn), calcium phosphate (anti-caking agent), flavoring agents, vitamins, minerals, butylated hydroxyanisole, and F, D & C dyes. Each solution was prepared by mixing 1 gram of the KOOL-AID® powder with enough water to make 450 to 500 cm$^3$ of solution.

Solution 1A: prepared as set forth above, no sugar added.

Solution 1B: Solution 1A+50 parts per million (ppm) tannic acid (certified, Fisher Scientific Co.).

Solution 1C: Solution 1A+200 ppm tannic acid (same tannic acid as in Solution 1B, hereafter "TA").

After the solutions were prepared, four 1 in$^2$ (6.45 cm$^2$) samples (Carpet Samples 1A, 1B, 1C, and Control) were cut from twisted, heat-set 66 nylon carpet, mock-acid dyed, and four 1-gram samples of 66 nylon skein (Test Fabrics, Middlesex, N.J.) were obtained (Yarn Samples 1A, 1B, 1C, and Control). Carpet Samples 1A, 1B, and 1C were soaked in 50 mL of Solutions 1A, 1B, and 1C, respectively, for 1 minute, and allowed to dry for 24 hours. The Carpet Control Sample was not exposed to any of the solutions. The same procedure was followed with Yarn Samples 1A, 1B, 1C, and Control. (The carpet and skeins had been scoured in 0.1% non-ionic detergent to remove surface grease and finish.)

All samples were rinsed thoroughly in distilled water, and allowed to dry.

The amount of staining on each sample was evaluated by comparison with the AATCC Staining Scale (AATCC Test Method, 175-1991), and by the CIE L, a, b values obtained from the Minolta Chromameter.

The results are set forth in Table 1.

TABLE 1

| Sample (ppm TA) | AATCC Staining Scale Rating | L, a, b |
| --- | --- | --- |
| Carpet Control | 10 | 85, −1, 2 |
| Carpet Sample 1A (no TA) | 2 | 67, 34, 12 |
| Carpet Sample 1B (50) | 6 | 78, 9, 3 |
| Carpet Sample 1C (200) | 10 | 83, 0.8, 2 |
| Yarn Control | 10 | 92, −0.8, 2 |
| Yarn Sample 1A (no TA) | 1 | 69, 41, 15 |
| Yarn Sample 1B (50) | 7 | 81, 12, 4 |
| Yarn Sample 1C (200) | 9 | 83, 8, 4 |

EXAMPLE 2

Green Tea Extract as Stain-Inhibiting Agent

The procedure in this Example was similar to that of Example 1.

1. Fifty grams of Chinese green tea leaves were extracted twice with 80/20 (v/v) acetone/water at room temperature for 30 minutes and filtered. The extract was vacuum dried for 30 minutes at 50° C., extracted with chloroform to decolorize, and vacuum dried at 50° C.
2. The staining solution, Solution 2A, was made up from 0.025 grams of F, D, & C Red 40 dye in 1 liter of distilled water, with ca. 3.2 grams of citric acid added to pH2.8; then 100 ppm of the decolorized green tea leaf extract was added to the staining solution to obtain Solution 2B.
3. Sample 2A (one gram of the 66 nylon skein as in Example 1) was immersed in the staining solution, Solution 2A, for one minute. A second yarn sample, Sample 2B, was immersed in staining/stain-inhibitor solution, Solution B, also for one minute. Both samples were then dried for 24 hours.
4. After rinsing and drying the yarn samples, stains were measured by the AATCC Staining Scale and by the Chromameter, as in Example 1. The AATCC and L, a, b data are set forth in Table 2.

TABLE 2

| Sample (ppm extract) | AATCC | L, a, b |
| --- | --- | --- |
| 2A (no extract) | 2 | 62, 26, 9 |
| 2B (100) | 9 | 82, 2, 1.9 |

EXAMPLE 3

Epicatechin Gallate As Stain-Inhibiting Agent

The procedure in this Example was the same as that of Example 2.

1. Approximately one gram of the green tea leaf extract was extracted three times with 100 mL ethyl acetate, and concentrated to about 50 mL, by vacuum at 50° C. Five mL of the concentrate was applied as a band on a Prep TLC plate (Analtech Silica, 70 m, 20 mm×20 mm) and dried at room temperature. The plate was eluted with 1:1 (v/v) ethyl acetate/chloroform as solvent. The epicatechin gallate (ECG) was identified by a comparison with standard obtained from C. T. Ho, Rutgers University. The ECG band was scraped off plate, extracted with ethyl acetate and freeze dried.
2. The staining solution was the same as that of Example 2 but is referred to herein as Solution 3A. Thus, Solution 3B was prepared by adding 100 ppm of the ECG to Solution 3A.
3. Yarn Samples 3A and 3B were prepared from one gram each of the 66 nylon yarn, stained with Solutions 3A and 3B and dried in the same manner as in Example 2.
4. The stains were measured, and the AATCC and L, a, b data are set forth in Table 3.

TABLE 3

| Sample (ppm ECG) | AATCC | L, a, b |
| --- | --- | --- |
| 3A (no ECG) | 2 | 63, 28, 10 |
| 3B (100) | 7 | 81, 4, 2 |

EXAMPLE 4

Gallic Acid+Fructose As Stain-Inhibiting Agent

The procedure was the same as that of Examples 2 and 3.

1. One gram each of Gallic Acid (certified, Fisher Scientific Co.) and Fructose (D. Sigma Chemical) were added to 50 ml of 5% $H_2SO_4$, and boiled for about 10 minutes. The resultant product was extracted with ethyl acetate.
2. This product was added to the staining solution of Examples 3 and 4 (hereafter Solution 4A) at the 0.1% concentration to obtain Solution 4B.
3. Yarn Samples 4A and 4B were prepared from of the 66 nylon yarn, stained with Solutions 4A and 4B and dried in the same manner as in Examples 2 and 3.
4. The stains were measured, and the AATCC and L, a, b data are set forth in Table 4.

TABLE 4

| Sample (TA/fructose) | AATCC | L, a, b |
| --- | --- | --- |
| 4A (none) | 1 | 67, 39, 14 |
| 4B (0.1%) | 8 | 84, 8, 12 |

What is claimed is:

1. A method for formulating a food product, comprising the steps of:
   a. coloring said food product with a color-imparting amount of a water-soluble dyestuff having a sulfonate or sulfonic acid substituent,
   b. inhibiting the potential staining action of the thus-colored food product, with respect to protonable nitrogen-containing polymeric material coming into contact with the food product, by adding to said food product a stain-inhibiting agent comprising a plant matter extract, said plant matter extract comprising a compound of formula I

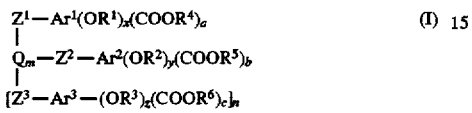

wherein:

$Z^1$, $Z^2$, and $Z^3$ are the same or different and are each a bridging radical or a direct bond, $Ar^1$, $Ar^2$, and $Ar^3$ are the same or different and are each a monocyclic aromatic radical or a bicyclic radical comprising an aromatic ring fused to a six-member cyclooxaaliphatic ring;

Q is a fused aromatic ring-containing bicyclic radical, or Q is a carbohydrate residue having a non-repeating structure, in which case m is 1, or Q is a carbohydrate having repeating saccharide units, in which case Q along with its substituents is repeated m times, where m is the number of said repeating saccharide units, but when Q is not a carbohydrate residue, m is 1;

$R^1$, $R^2$, and $R^3$ are the same or different and are each hydrogen or a polyhydroxybenzoyl radical, $R^4$, $R^5$, and $R^6$ are the same or different and are each H or the residue of an esterified alcohol, x, y, and z are the same or different and are each a number from 2 to 3, a, b, and c are the same or different and are each a number from 0 to 1, n is a number from 0 to 1, except that when Q is an oligo- or polysaccharide having terminal saccharide units, n, in the terminal saccharide units, is from 0 to 2, and when n is zero, $-Z^1-Q_m-Z^2-$ is optionally a direct bond.

2. A method according to claim 1, wherein said plant matter extract is obtained from plant matter comprising a leafy material, a fruit, a tree, a shrub, or a flowering plant.

3. A method according to claim 1, wherein the amount of stain-inhibiting agent added to said food product is in the range of about 1 to about 2000 parts per million.

4. A method for providing a barrier to the staining of a polymeric material caused by contact with a dye having an affinity for said polymeric material, said method comprising:
   applying to the polymeric material a stain-inhibiting amount of a stain-inhibiting agent comprising a compound of formula I

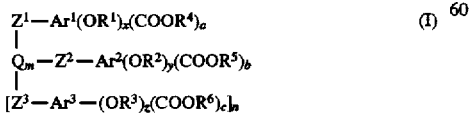

wherein:

$Z^1$, $Z^2$, and $Z^3$ are the same or different and are each a bridging radical or a direct bond, $Ar^1$, $Ar^2$, and $Ar^3$ are the same or different and are each a monocyclic aromatic radical or a bicyclic radical comprising an aromatic ring fused to a six-member cyclooxaaliphatic ring;

Q is a fused aromatic ring-containing bicyclic radical, or Q is a carbohydrate residue having a non-repeating structure, in which case m is 1, or Q is a carbohydrate having repeating saccharide units, in which case Q along with its substituents is repeated m times, where m is the number of said repeating saccharide units, but when Q is not a carbohydrate residue, m is 1;

$R^1$, $R^2$, and $R^3$ are the same or different and are each hydrogen or a polyhydroxybenzoyl radical, $R^4$, $R^5$, and $R^6$ are the same or different and are each H or the residue of an esterified alcohol, x, y, and z are the same or different and are each a number from 2 to 3, a, b, and c are the same or different and are each a number from 0 to 1, n is a number from 0 to 1, except that when Q is an oligo- or polysaccharide having terminal saccharide units, n, in the terminal saccharide units, is from 0 to 2, and when n is zero, $-Z^1-Q_m-Z^2-$ is optionally a direct bond.

5. A method according to claim 4, wherein said polymeric material contains protonable nitrogen atoms, the stain-inhibiting agent forms said barrier to the staining of polymeric material by becoming associated with said protonatable nitrogen atoms, the association with each said protonatable nitrogen atom involving a plurality of phenolic hydroxyl groups present in the stain-inhibiting agent.

6. A method according to claim 4, wherein the stain inhibiting amount of stain-inhibiting agent is applied simultaneously with the contact with the dye.

7. A composition comprising:
   an artificial water-soluble dyestuff reactive with a protonatable nitrogen of a polymeric material and having at least one water-solubilizing $SO_3^\ominus$ anion substituted on the water-soluble dyestuff molecule, and
   a stain-inhibiting agent comprising a compound of formula I

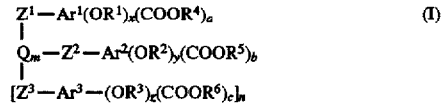

wherein:

$Z^1$, $Z^2$, and $Z^3$ are the same or different and are each a bridging radical or a direct bond, $Ar^1$, $Ar^2$, and $Ar^3$ are the same or different and are each a monocyclic aromatic radical or a bicyclic radical comprising an aromatic ring fused to a six-member cyclooxaaliphatic ring;

m is a number which is at least 1;

Q is a fused aromatic ring-containing bicyclic radical, in which case m is 1, or Q is a carbohydrate residue having a non-repeating structure, in which case m is 1, or Q is a carbohydrate having repeating saccharide units, in which case m is greater than 1, and Q along with its substituents is repeated m times, m being the number, greater than 1, of said repeating saccharide units, $R^1$, $R^2$, and $R^3$ are the same or different and are each hydrogen or a polyhydroxybenzoyl radical, R⁴, R⁵, and R⁶ are the same or different and are each H or the residue of an esterified alcohol, x, y, and z are the same or different and are each a number from 2 to 3, a, b, and c are the same or different and are each a number from 0 to 1, n is a number from 0 to 1, except that when Q is an oligo- or polysaccharide having terminal saccharide units, n, in the terminal saccharide units, is from 0 to 2, and when n is zero, —Z¹—Q$_m$—Z²— is optionally a direct bond.

8. A composition according to claim 7, wherein said composition is a food product comprising about 1 to about 2000 parts per million by weight, based on the weight of the fully constituted food product, of the artificial water-soluble dyestuff, and about 8 to about 500 parts per million by weight, on the same basis, of the stain-inhibiting agent.

9. A composition according to claim 8, wherein said food product, when fully constituted, contains an aqueous liquid.

10. A composition according to claim 9, wherein said food product, when fully constituted has a pH less than 7.

11. A composition according to claim 8, wherein a said —SO₃⁻ anion is in the form of an —SO₃Na salt group or an —SO₃H group.

12. A composition according to claim 7, wherein said stain-inhibiting agent comprises a compound of formula II

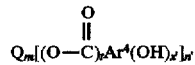  (II)

wherein:

x' is a number from 2 to 3;

t is 0 or 1, and when t=0, there is a direct bond from Q to Ar⁴;

Ar⁴ is a monocyclic aromatic radical or a bicyclic group in which one of the rings is a benzene ring and the other ring, to which the benzene ring is fused, is a partially unsaturated cycloaliphatic or cyclooxaaliphatic ring;

Q is the residue of a carbohydrate having m repeating saccharide units; m being at least 1, or m=1 and Q is a fused aromatic ring-containing bicyclic radical; and n' is a number from 2 to 3, unless Q is the residue of a carbohydrate having a plurality of repeating saccharide units; in which case, when Q is a terminal saccharide unit, n' is a number from 2 to 4.

13. A composition as claimed in claim 7, wherein:

said stain-inhibiting agent comprises a compound of the formula V

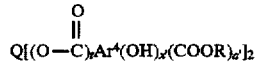  (V)

where t is 0 or 1, and when t=0, there is a direct bond from Q to Ar⁴, x' is a number from 2 to 3, a' is 0 or 1, and where a'=1, R is hydrogen or the residue of an esterified alcohol, Ar⁴ is a monocyclic aromatic radical or a bicyclic group in which one of the rings is a benzene ring and the other ring, to which the benzene ring is fused, is a partially unsaturated cycloaliphatic or cyclooxaaliphatic ring; and Q is either a direct bond, in which case the radical

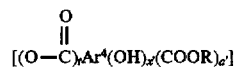

is dimerized, or

Q is a bicyclic structure comprising a benzene ring fused to a partially unsaturated cycloaliphatic ring.

14. A composition according to claim 8, wherein the stain-inhibiting agent comprises a compound of formula VI

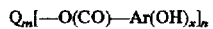  (VI)

wherein:

x is a number from 2 to 3, n is a number from 2 to 3,

Q is the residue of a glycoside having m repeating units, m is a number from 1 to about 1500, and Ar is a monocyclic aromatic radical or a bicyclic radical comprising an aromatic ring fused to a six-member cyclooxaaliphatic ring.

15. A composition according to claim 14, wherein m is 1, and n is 3.

16. A composition according to claim 15, wherein x is 3.

17. A composition according to claim 7, wherein said stain-inhibiting agent of claim 7 consists essentially of a naturally-occurring, substantially non-toxic compound which has been either artificially synthesized or extracted from plant matter.

18. A composition according to claim 17, wherein said naturally-occurring, substantially non-toxic compound is obtained by extraction from plant matter.

19. A composition according to claim 18, wherein said plant matter comprises a leafy material, a fruit, a tree, a shrub, or a flowering plant.

20. A composition according to claim 8, wherein said water-soluble dyestuff consists essentially of an F, D, and C dye.

* * * * *